United States Patent
Bruce et al.

(10) Patent No.: US 7,731,996 B2
(45) Date of Patent: Jun. 8, 2010

(54) DIETARY REGIME FOR COMPANION ANIMALS

(75) Inventors: Jennifer Susan Bruce, Waltham-On-The-Wolds (GB); Richard G. Bradley, Leicestershire (GB); Simon Reginald Hall, Leicestershire (GB)

(73) Assignee: Mars, Inc., McLean, VA (US)

( * ) Notice: Subject to any disclaimer, the term of this patent is extended or adjusted under 35 U.S.C. 154(b) by 41 days.

(21) Appl. No.: 11/946,324

(22) Filed: Nov. 28, 2007

(65) Prior Publication Data

US 2008/0069921 A1    Mar. 20, 2008

Related U.S. Application Data

(63) Continuation of application No. 10/312,460, filed as application No. PCT/GB01/02760 on Jun. 21, 2001, now abandoned.

(30) Foreign Application Priority Data

Jun. 23, 2000 (GB) ................................. 0015440.1

(51) Int. Cl.
A23K 1/18 (2006.01)
(52) U.S. Cl. .......................................... 426/2; 426/635
(58) Field of Classification Search ..................... 426/2, 426/601, 805, 635
See application file for complete search history.

(56) References Cited

U.S. PATENT DOCUMENTS

| | | | |
|---|---|---|---|
| 6,156,355 A | 12/2000 | Shields, Jr. et al. | |
| 6,203,825 B1 | 3/2001 | Hodgkins | |
| 6,358,546 B1 | 3/2002 | Bebiak et al. | |
| 6,410,063 B1 | 6/2002 | Jewell et al. | |
| 6,669,975 B1 | 12/2003 | Abene et al. | |
| 6,737,078 B1 | 5/2004 | Kelley | |
| 2001/0048955 A1 | 12/2001 | Foreman et al. | |

FOREIGN PATENT DOCUMENTS

| | | |
|---|---|---|
| GB | 2 232 573 A1 | 12/1990 |
| JP | 11075710 | 3/1999 |
| JP | 2000014326 | 1/2000 |

OTHER PUBLICATIONS

XP-001024475—Finco, Delmar R., et al.; Food and water intake and urine composition in cats: Influence of continuous versus periodic feeding; Am J Vet Res, vol. 47 (7), pp. 1638-1642, Jul. 1986.
XP-001024476—Decombaz, J., et al.; Abstract—Diet and food intake of sled dogs during a multi-stage race 1998.
XP-001024689—Russell, K., et al.; Influence of feeding regimen on body condition in the cat; Journal of Small Animal Practice (2000) 41, pp. 12-17.
XP-001024688—Earle, K. E.; Feeding for health; Journal of Small Animal Practice (1990) 31, pp. 477-481.
Reinhart et al., "Nutrition for sporting dogs", Canine sports medicine and surgery /. Philadelphia : Saunders, 1998, 348-356.
Reynolds et al., F.A.S.E.B. Journal, Abstract 5775, Experimental Biology '95. Atlanta, Georgia, T1-T30, Part II, p. A 996, 1995.
Kronfeld et al., J.A.V.M.A., vol. 162(6), pp. 470-473, 1973.
Tabor, Roger, "Understanding cat behaviour : the complete feline problem solver", p. 140, (1997).
The Amber Foundation, "Dangers of Not Eating" and "Getting A Cat To Eat", <http://amberfoundation.org/Feeding/_MainFeeding.html> (2005) (last visited Dec. 7, 2009).

*Primary Examiner*—C. Sayala
(74) *Attorney, Agent, or Firm*—Fulbright & Jaworski, LLP

(57) ABSTRACT

The present invention provides a dietary regime for a companion animal. The dietary regime comprises feeding the companion animal a food product which is designed for administration for a particular event. The present invention includes a sequence of products for feeding at prescribed times or in a prescribed order to accommodate a physiological need or modify a physiological response.

4 Claims, 3 Drawing Sheets

US 7,731,996 B2

DIETARY REGIME FOR COMPANION ANIMALS

CROSS-REFERENCE TO RELATED APPLICATIONS

This application is a Continuation of U.S. application Ser. No. 10/312,460 filed on Jul. 22, 2003 now abandoned, which is a national stage application of PCT/GB01/002760 filed on Jun. 21, 2001 claiming priority to GB 0015440.1 filed Jun. 23, 2000.

TECHNICAL FIELD

The present invention provides a dietary regime for a companion animal. The dietary regime comprises feeding the companion animal a food product which is designed for administration for a particular event. The present invention includes a sequence of products for feeding at prescribed times or in a prescribed order to accommodate a physiological need or modify a physiological response.

BACKGROUND OF THE INVENTION

It is a constant desideratum to determine novel feeding regimes and novel food combinations for companion animals. Such feeding regimes can contribute to overcoming feeding problems in fussy animals, unhealthy eating, lack of enjoyment of eating for the animals and lack of enjoyment or satisfaction experienced by the animal caregiver/owner.

BRIEF SUMMARY OF THE INVENTION

Accordingly, a first aspect of the present invention provides a dietary regime for a companion animal. The dietary regime comprises feeding the companion animal a food product which is designed for administration for a particular event. The present invention also provides a sequence of products for feeding (or fed) at prescribed times or in a prescribed order that accommodate a physiological need or modify a physiological response. The first aspect of the invention may include a sequence of products for feeding (or fed) at prescribed times or in a prescribed order that accommodate a physiological need or modify a physiological response.

The dietary regime includes feeding the animal one or more food products at one or more times. The times may be in the same day, week or year.

The dietary regime according to the present invention enables the provision, to a companion animal, of meals specifically formulated to meet their macronutrient preference for different events. A macronutrient preference, by companion animals, for different events, has been identified by the inventors and provides the technical basis for the present invention. In accordance with the findings for macronutrient preferences, the dietary regime of the present invention enhances the animal's enjoyment of the food and provides an increase (perceived or real) in enjoyment or satisfaction by the caregiver/owner of the companion animal.

In the dietary regime, the event may be a particular part of the day, a particular day of the week or a particular day of the year. Preferably, the event is a particular part of the day.

In accordance with typical feeding patterns for companion animals, food products are provided as meals in the morning and in the afternoon or evening. Additional food products may be provided in between, such as mid-morning, during the middle part of the day, mid-afternoon, or in the evening. Companion animals have, in accordance with the findings of the present invention, shown preferences for macronutrient content for such particular events. In addition, caregiver/owners of companion animals are able to easily identify suitable food products, according to the present invention by their labeling for administration for a particular event.

The invention includes any dietary regime or sequence of products fed at prescribed times or in a prescribed order that either accommodate a physiological need or modify a physiological response and/or are designed for administration for a particular event and may include:

A breakfast food for administration as the first food of the day, containing an energy content and a macronutrient profile appropriate to the level of expected activity in the day.

A dinner or supper food for administration as the last food of the day, with an energy content and macronutrient profile appropriate to a inactive or sleeping animal.

A fiber-controlled diet for avoiding toileting during the night.

Food for particular seasons, for example designed in relation to the nutritional needs of the skin and coat.

The companion animals of the present invention are, in particular, the domestic cat (*Felis domesticus*) or the domestic dog (*Canis domesticus*). Other companion animals include fish, birds and horses.

Different nutrient profiles of food (nutritional compositions) include different contents of one or more of fat, protein, carbohydrate, calorie density, fiber, vitamins or minerals. The composition of one pet food product may have a higher or lower content of one or more of these nutritional components compared to the composition of another pet food product.

The dietary regime of the present invention preferably comprises one pet food product for feeding as the morning meal and one pet food product for feeding as the afternoon/evening meal. Additional snacks for in between meals or additions to the main meal (e.g. kibbles) may be included.

One macronutrient preference which has been shown by companion animals is for an increase in the total fat content of the afternoon/evening meal compared to the morning meal. Accordingly, the dietary regime of the invention preferably includes one of the pet food products having a higher content of fat than one other pet food product in a daily regime. The product with the higher fat content is preferably fed to the companion animal as the afternoon/evening meal.

Another macronutrient preference has been shown by companion animals. It is a composition having a higher protein content for the morning food compared to the afternoon/evening meal. Accordingly, the dietary regime of the present invention may include one pet food product having a higher content of protein than one other pet food product in a daily regime. The product with the higher protein content is preferably fed to the pet animal as the main morning meal.

A preferred feature of the present invention results from a demonstrated increase in relative intake for the higher fat product in the afternoon/evening meal compared with products with a lower fat content. The higher fat content is preferably in replacement of protein or in replacement of carbohydrate.

In accordance with the guidelines for complete nutritional adequacy, the following are preferred limits for all foods of the present invention; no less than 20% of the calories should be from fat; no less than 25% of the calories should come from protein; no food should contain more than 75% of calories derived from fat. Accordingly, the preferred food should contain between 20% and 75% of calories from fat.

Further preferences for the food of the dietary regime of the present invention are that the fat content of the afternoon/evening food should be higher than the fat content of the morning food by at least 5% of the total calorie content of the food. Further preferences are that the calories contributed by the fat content of the food for the morning should be between 20% and 70% of the total calorie content of the food and the fat content of the food for the afternoon/evening should contribute between 25% and 75% of the total calorie content of the food. The food fed in the afternoon/evening should be higher in fat content than the morning food by at least 5% of the total calorific value of the product, preferably by 10%, more preferably by 15%.

Each pet food product may be a dry, semi-moist or a moist (wet) product. Wet food includes food that is usually sold in tins and has a moisture content of 70% to 90%. Dry food includes food having a similar composition but with 5% to 15% moisture, often presented as small biscuit—like kibbles. Semi-moist food includes food having a moisture content of from above 15% up to 70%. The amount of moisture in any product may influence the type of packaging that can be used or is required.

The pet food products as part of the dietary regime according to the present invention encompass any product that a pet consumes in its diet. Thus, the invention covers the standard food products as well as pet food snacks (for example snack bars, cereal bars, snacks, biscuits and sweet products). The food product may be a cooked product. It may incorporate meat or animal-derived material (such as beef, chicken, turkey, lamb, fish, blood plasma, marrowbone, etc or one or more thereof). The product alternative may be meat-free (preferably including a meat substitute such as soya, maize gluten or a soya product) in order to provide a protein source. The product may contain additional protein sources such as soya protein concentrate, milk, protein, gluten, etc. The product may also contain a starch source such as one or more grains (e.g. wheat, corn, rice, oats, barley, etc) or may be starch-free. The product may incorporate or be a gelatinized starch matrix. The product may incorporate one or more types of fiber such as sugar beet pulp, chicory pulp, chicory, coconut endosperm fiber, wheat fiber etc. The content of the product/ingredients contributes towards the macronutrient profile of the food. Thus, food products which according to the present invention provide a higher fat content will be designed accordingly. Dairy products, such as those incorporating a cream or a cheese sauce, may be suitable. The present invention is particularly relevant for a pet food product as described herein which is sold as a pet food, in particular a pet food for a dog or a cat.

A second aspect of the present invention provides a pet food product which is part of a dietary regime according to the first aspect of the invention.

Preferred features of the first aspect of the invention also apply to the second aspect.

A third aspect of the present invention provides for the use of a pet food product according to the second aspect of the invention, in a dietary regime.

Preferred features of the first and second aspects also apply to the third aspect.

A fourth aspect of the invention provides for the use of ingredients in the manufacture of a pet food product for a dietary regime according to the first aspect of the invention.

Preferred features of the first to third aspects of the invention also apply to the fourth aspect.

Packaging of the products in the regime enables the regime to be labeled appropriately. The regime may include packs of food, individual or possibly combined (as a "multi-pack") for periods of time such as one week, or even longer. Accordingly, such a "multi-pack" may comprise seven individual food packs, each one for a day of the week. Alternatively, they may include weekend multipacks, or holiday multipacks. The individual food packs may be identical or different.

The foodstuff is preferably packaged. In this way, the consumer is able to identify, from the packaging, the ingredients in the foodstuff and confirm that it is suitable for the particular pet in question. The packaging may be metal (usually in the form of a tin or flexifoil), plastic (usually in the form of a pouch or bottle), paper or card. The amount of moisture in any product may influence the type of packaging, which can be used or is required.

The dietary regime according to the present invention provides benefits to the companion animal of increased acceptance (includes palatability), increased enjoyment in feeding and/or increase in enjoyment or satisfaction by the caregiver/owner of the animal.

The enjoyment of the animal and/or increase in acceptance/palatability can be determined, for example, by one or more of the following:

An increase in the quantity of food consumed;

A decrease in the frequency of refusals to eat over an extended period of time;

An increase in enthusiasm during the meal as indicated by a reduction in the time taken to start a meal and/or an increase in the speed at which food is consumed;

The animal chooses the food over another food;

The animal refuses other foods;

or by any other behavior by the animal which is taken by the owner/caregiver to be an indication of enjoyment of the food, for example:

The animal rubs around the owner/caregiver when serving the food.

The animal is inactive/rests or sleeps after eating.

The animal licks itself or washes after eating.

BRIEF DESCRIPTION OF THE DRAWINGS

The invention is described with reference to the drawings, where.

DETAILED DESCRIPTION OF THE INVENTION

The invention will now be described with reference to the following, non-limiting examples:

EXAMPLES

Macronutrient energy content for all examples (and in accordance with the embodiments of the present invention) is determined by the calculations in Annex 1. The following data demonstrate the difference between morning and afternoon macronutrient preferences.

Example 1

Studies with Wet Cat Food Diets of Varying Protein and Fat Contents

Diets were designed containing different levels of the macronutrients protein and fat. All diets were isocaloric and contained 3 different ratios of protein to fat calories i.e. 10%: 90%, 40%:60% and 70%:30% respectively (increasing in calories derived from protein). All 3 diets were fed in rotation for 30 days, i.e. each cat was fed one diet per day; therefore each diet was experienced 10 times. Food was provided for 45 minutes in the morning, then the same diet was fed overnight.

Feeding data from the first 20 minutes of the morning meal and the first 20 minutes of the afternoon meal showed that in the morning, there was similar separation of 10%, 40% & 70% protein calorie diets. Overall, these data indicate that cats prefer diets containing higher protein in the morning.

In the afternoon meal, there was less preference for the 70% diet relative to 40% & 10% PER diets. Overall, these data indicate that cats preferred relatively lower protein (and hence higher fat) in the afternoon.

Figure 1:
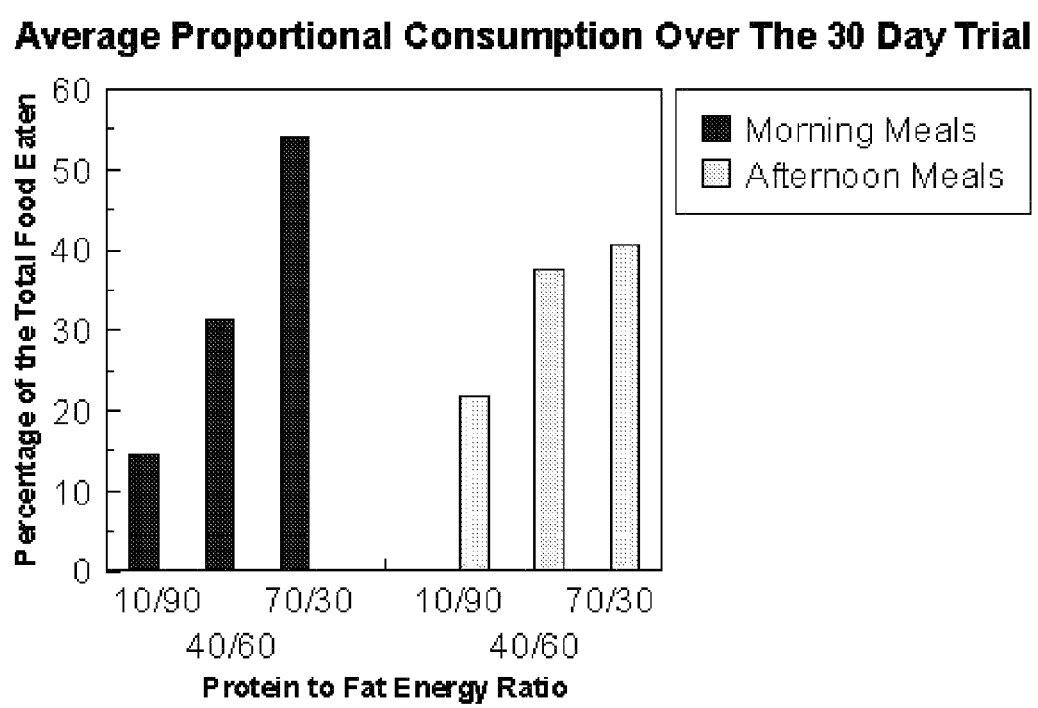
FIG. 1 shows average quantities consumed in the first 20 minutes of a meal in relation to wet diets that differ in terms of their protein and fat content for morning and afternoon meals.

The average intake of each diet over the whole 30 days of the trial, for morning and afternoon meals, is shown in FIG. 1. The consumption of each product is expressed as a percentage of the total eaten within the all the meals in the morning or all the meals in the afternoon.

Example 2

Studies with Wet Cat Food Diets of Varying Protein, Fat and Carbohydrate Contents Canned diets were designed that had the same base meat recipe, to which was added isocaloric amounts of protein, fat and carbohydrate. All 3 diets were fed in rotation for 30 days, i.e. each cat was fed one diet per day; therefore each diet was experienced 10 times. Food was provided for 45 minutes in the morning, then the same product was fed for 45 minutes in the afternoon.

Feeding data from the first 20 minutes of the morning meal and the first 20 minutes of the afternoon meal showed that in the morning, preference was for the products supplemented with protein over the products supplemented with fat over the products supplemented with carbohydrate.

In the afternoon meal fat is significantly preferred over the other products. Overall these data, indicate that cats preferred higher fat (rather than protein or carbohydrate) in the afternoon.

Figure 2:
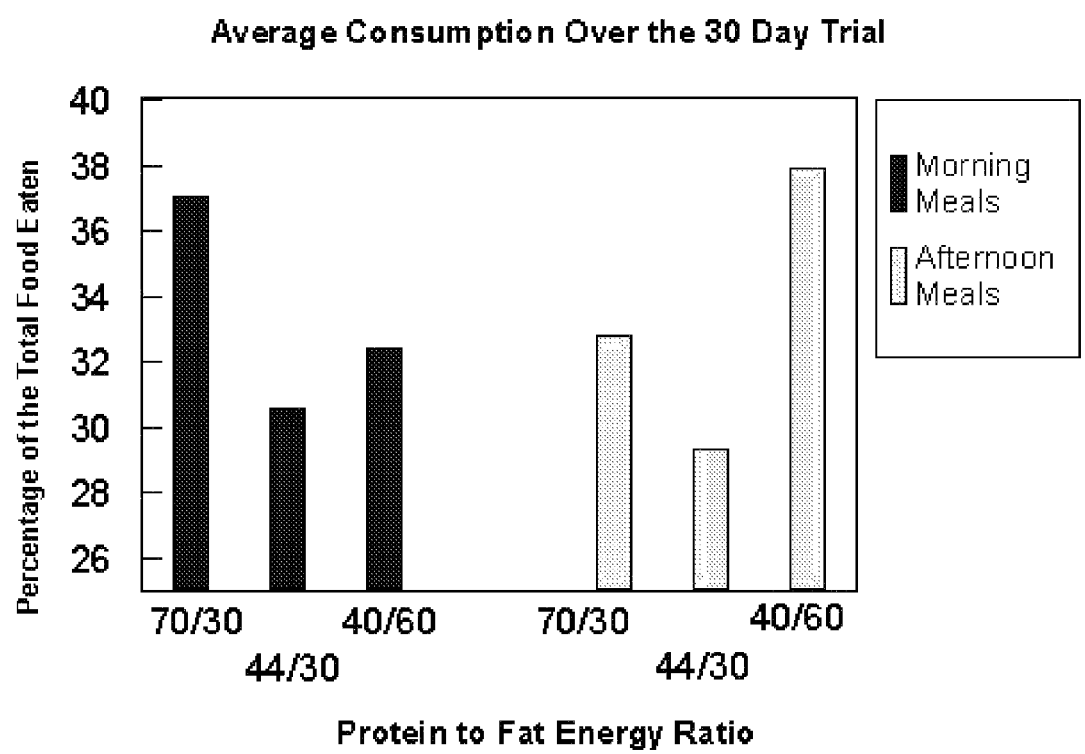
FIG. 2 shows average quantities consumed in the first 20 minutes of a meal in relation to wet diets that differ in terms of their content of protein fat and carbohydrate for morning and afternoon meals.

The average intake of each diet over the whole 30 days of the trial, for morning and afternoon meals, is shown in FIG. 2. The consumption of each product is expressed as a percentage of the total eaten within the all the meals in the morning or all the meals in the afternoon.

Further data have been obtained using these same products under a different feeding regimen, i.e. a 45-minute meal in the morning followed by an overnight meal of the same product. Feeding data from the first 20 minutes of the morning meal and the first 20 minutes of the afternoon meal showed that the preference was clearly for fat in the afternoon. A preference is also shown for protein in the morning.

Example 3

Studies with Dry Diets of Various Fat and Carbohydrate Contents

Five dry diets of approximately constant protein content, but varying in fat and carbohydrate content were fed in rotation for 5 days, i.e. each cat was fed one diet per day but different groups of cats were exposed to the diets in different orders. Food was provided for 60 minutes in the morning and then the same product was fed for 30 minutes in the afternoon.

The diets had fat contents of 21%, 16.5%, 12%, 10% and 9% on a dry matter basis, equivalent to fat energy contents of 44%, 37%, 28%, 25% and 23%.

Figure 3:
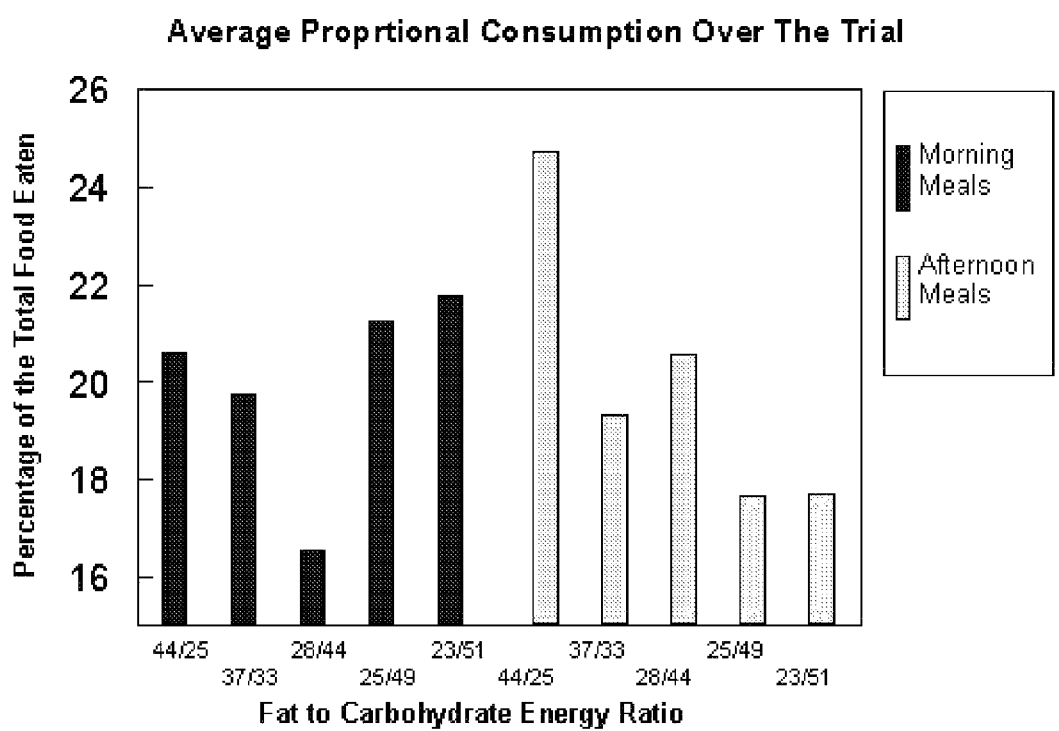
FIG. 3 shows average quantities consumed of dry diets in a 60 minute morning meal and a 30 minute afternoon meal where the diets vary in their content of fat and carbohydrate.

In the morning meals there was little difference in the mean intakes of the high and low fat dry diets. However, in the afternoon meal, the average data showed a clear trend to higher intakes for the high fat products rather than the low fat products, see FIG. 3.

Annex 1

Calculations for predicting the metabolisable energy (PME) of foods for companion animals.

These calculations use modified Atwater factors based on recommended texts e.g. Association of American Feed Control Officials, and species specific studies.

Cat Products:

Canned: (% Protein×3.9)+(% Fat×7.7)+(% *NFE*× 3.0)−5.0=kcal *PME*/100 g product

Dry: (% Protein×3.5)+(% Fat×8.5)+((% *NFE*−% Crude Fiber)×3.5)=kcal *PME*/100 g product Dog Products Canned and Dry: (% Protein×3.5)+(% Fat×8.5)+((% *NFE*−% Crude Fiber)×3.5)=kcal *PME*/100 g product

*NFE*=Nitrogen Free Extract and is calculated by difference: 100−(% Protein+% Fat+% Ash+% Moisture)

The % protein, fat, ash, moisture and/or crude fiber are determined in accordance with the Standard Proximate Analysis as set out in Pearson's Composition and Analysis of Foods, Ninth Edition (1991).

OTHER EMBODIMENTS

It is to be understood that, while the invention has been described in conjunction with the detailed description thereof, the foregoing description is intended to illustrate and not limit the scope of the invention. Other aspects, advantages, and modifications of the invention are within the scope of the claims set forth below.

What is claimed is:

1. A method for providing a diet for a feline companion animal, the method comprising sequentially administering pet food products in the following steps:
   a) feeding the feline companion animal a first food product during the afternoon or during the evening, and
   b) feeding the feline companion animal a second food product during the morning, wherein the composition of the first food product comprises a fat content providing at least a 5% higher fat energy content to the first food product relative to the second food product.

2. The method of claim 1, wherein the second food product comprises fat at a proportion of between 20% and 70%.

3. The method of claim 1, wherein the first food product comprises fat at a proportion of between 25% and 75%.

4. The method of claim 1, wherein steps a) and b) are repeated at least once.

* * * * *